B. R. HILL, Sr.
Brush.

No. 196,802. Patented Nov. 6, 1877.

WITNESSES:
J. H. Scarborough
J. M. Henley

INVENTOR:
B. R. Hill, Sr.
BY
ATTORNEYS.

UNITED STATES PATENT OFFICE.

BENJAMIN R. HILL, SR., OF POMPTON, NEW JERSEY.

IMPROVEMENT IN BRUSHES.

Specification forming part of Letters Patent No. 196,802, dated November 6, 1877; application filed September 29, 1877.

*To all whom it may concern:*

Be it known that I, BENJAMIN R. HILL, Sr., of Pompton, in the county of Passaic and State of New Jersey, have invented a new and Improved Brush, of which the following is a specification:

This invention relates to the attachment of tufts of bristles, reeds, or other suitable brush material, to the heads or blocks of the brushes in a more permanent and cheaper manner than has hitherto been done.

The nature of my invention consists in securing the roots of the tufts into dovetail receptacles formed in the heads of the brush, by means of wedges driven into said holes at the same time that the tufts are inserted, as will be hereinafter described.

Figure 1:
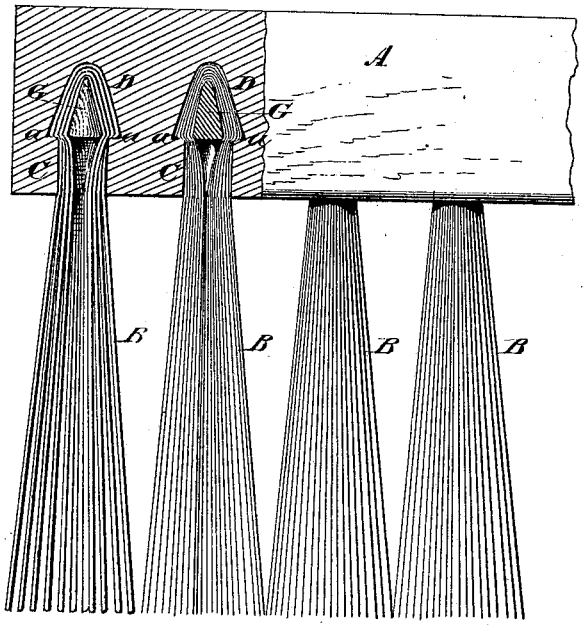
Figure 2:
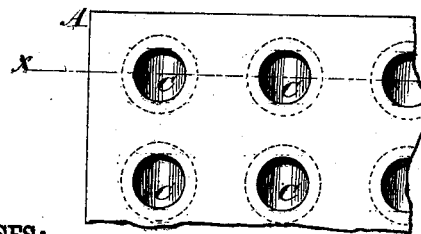
Figure 3:
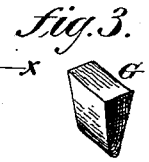

In the annexed drawings, Figure 1 is a side view of part of a brush, partly in section. Fig. 2 is a bottom view of part of the brush-head without the tufts. Fig. 3 is a perspective view of one of the wedges.

Similar letters of reference indicate corresponding parts.

The letter A designates the brush head or block, and B the tufts of bristles, reeds, or other suitable material. C C designate circular holes, which are arranged at suitable distances apart, and bored a short distance into the bottom of the brush-block. After boring the holes C, a tool suitably adapted to the purpose is introduced into them, and circular tapering holes D D are formed, the bases of which are of greater diameter than the cylindrical holes C. I thus produce cylindrical holes which terminate in circular dovetail receptacles.

The brush material which forms the tufts is cut a suitable length, doubled, and at the point of doubling a wedge, G, is applied. The tufts are then forcibly driven into their places, and by the expansion of the wedges G in the dovetail holes D the brush material is crowded over the shoulders *a* and securely and permanently held.

Having thus described my invention, I claim as new and desire to secure by Letters Patent—

A brush having the roots of its tufts secured into the head or block A by means of wedges G, forced into dovetail holes D, substantially as described.

BENJAMIN R. HILL, SR.

Witnesses:
 C. SEDGWICK,
 ALEX. F. ROBERTS.